(12) United States Patent
Jahromi

(10) Patent No.: US 10,254,083 B2
(45) Date of Patent: Apr. 9, 2019

(54) TELESCOPIC GUN SIGHT WITH TILTED VIEWING AXIS

(71) Applicant: Omid S. Jahromi, Playa Vista, CA (US)

(72) Inventor: Omid S. Jahromi, Playa Vista, CA (US)

(73) Assignee: Lucida Research LLC

( * ) Notice: Subject to any disclaimer, the term of this patent is extended or adjusted under 35 U.S.C. 154(b) by 0 days.

(21) Appl. No.: 15/150,510

(22) Filed: May 10, 2016

(65) Prior Publication Data
US 2016/0356572 A1 Dec. 8, 2016

Related U.S. Application Data

(62) Division of application No. 14/732,524, filed on Jun. 5, 2015, now Pat. No. 9,417,037.

(51) Int. Cl.
| | |
|---|---|
| *G02B 23/00* | (2006.01) |
| *F41G 11/00* | (2006.01) |
| *F41G 1/38* | (2006.01) |
| *G02B 26/08* | (2006.01) |
| *G02B 23/02* | (2006.01) |
| *G02B 25/00* | (2006.01) |
| *G02B 27/32* | (2006.01) |

(52) U.S. Cl.
CPC ............... *F41G 11/00* (2013.01); *F41G 1/38* (2013.01); *G02B 23/02* (2013.01); *G02B 25/001* (2013.01); *G02B 26/0891* (2013.01); *G02B 27/32* (2013.01)

(58) Field of Classification Search
CPC ........ G02B 23/00; G02B 23/02; G02B 23/12; G02B 23/16; G02B 23/2446; G02B 25/00; G02B 23/18; G02B 23/2242; F41G 1/38; F41G 11/00
See application file for complete search history.

(56) References Cited

U.S. PATENT DOCUMENTS

| | | | | |
|---|---|---|---|---|
| 708,720 | A | * | 9/1902 | Konig |
| 3,782,822 | A | * | 1/1974 | Spence ............... G02B 23/145 356/21 |
| 3,948,587 | A | * | 4/1976 | Rubbert ................. G01C 3/04 356/21 |
| 4,545,655 | A | | 10/1985 | Fantone et al. |
| 4,582,400 | A | | 4/1986 | Lough |
| 4,717,239 | A | * | 1/1988 | Steenblik ................ G02B 5/04 348/E13.033 |
| 5,793,525 | A | * | 8/1998 | Sabin .................... G02B 21/24 359/368 |
| 7,944,611 | B1 | * | 5/2011 | Regan ..................... F41G 1/38 359/422 |
| 9,417,037 | B2 | * | 8/2016 | Jahromi .................. F41G 1/38 |
| 9,746,660 | B2 | * | 8/2017 | Jahromi ................ G02B 23/02 |
| 2005/0119529 | A1 | * | 6/2005 | Farr ...................... A61B 1/055 600/160 |

(Continued)

Primary Examiner — Thong Q Nguyen

(57) ABSTRACT

A telescopic gun sight whose viewing axis is tilted with respect to the sight's main optical axis is disclosed. A refracting wedge prism is added to the optical layout of a telescopic sight after the eyepiece to tilt the viewing axis and provide an offset eyepoint. The tilted viewing axis provides better ergonomics when the telescopic sight is used in combination with other type of sights such as a reflex sight.

2 Claims, 4 Drawing Sheets

(56) References Cited

U.S. PATENT DOCUMENTS

| | | | |
|---|---|---|---|
| 2006/0232858 A1* | 10/2006 | Karbe | G03B 13/06 359/431 |
| 2011/0068279 A1* | 3/2011 | Fay, Jr. | G02B 21/10 250/459.1 |
| 2012/0192478 A1* | 8/2012 | Jahromi | F41G 1/38 42/122 |
| 2014/0259853 A1 | 9/2014 | Crispin | |
| 2017/0321993 A1* | 11/2017 | Crispin | G02B 23/105 |

* cited by examiner

TELESCOPIC GUN SIGHT WITH TILTED VIEWING AXIS

I. CROSS-REFERENCE TO RELATED APPLICATIONS

This application is a divisional application of my co-pending application Ser. No. 14/732,524, filed on Jun. 5, 2015, now U.S. Pat. No. 9,417,037.

II. FIELD OF THE INVENTION

This application relates to a telescopic sight wherein the axis of view is tilted.

III. BACKGROUND OF THE INVENTION

Telescopic sights, also called riflescopes, enable soldiers and riflemen to aim at distant targets with high accuracy. In telescopic sights, the "point of aim" is often designated by a reticle or cross hairs. The eyepiece of a telescopic sight has an "exit pupil". This is a virtual pupil located on the eyepiece optical axis at a set distance behind the eyepiece. This distance is called "eye relief". To see the whole field of view, the shooter must position his head such that his eye pupil is at the exit pupil. In a riflscope, the eye relief must be least 5 cm to prevent the eyepiece hitting the shooter's forehead when the rifle recoils. On high-power hunting rifles, a longer eye relief such as 9 cm or 12 cm is preferred. The concepts of exit pupil and eye relief are well-known in the art and are described in most riflescope manufacturers catalogs.

When a riflescope is mounted on a rifle, its optical axis will be positioned higher than the optical axis of the rifle's open sights. Therefore, to aim through his riflescope, the shooter has to raise his head from the position he would otherwise uses if he were aiming with the open sights. This situation is illustrated in FIG. 1(a). The required shift in head position is more pronounced when the riflescope has a large objective lens which necessitates a high mount. A high riflescope mount is also required on certain bolt-action rifles (e.g. the famous Mauser M-98) to allow for the bolt to operate freely. To help the shooter align his eye with the optical axis of a high-mounted riflescope, some rifle stocks are equipped with a raised or adjustable comb (see FIG. 1(a)). However, a raised comb would make the rifle unsuitable for use with open sights. A better solution would be to design the riflescope with tilted viewing axis such that its exit pupil is lower than its optical axis. This way, the shooter can see the target image without the need to raise his head.

Another application where a tilted viewing axis is advantageous is when a secondary sight such as a non-magnifying reflector sight is mounted on top of the main telescopic sight (See FIG. 1(b)). This configuration is often used by soldiers in combat situations where a soldier needs to engage enemy positions at both close and far distances in quick succession. He can use the non-magnifying reflector sight for engaging targets at close distances. The telescopic sight is used for aiming at distant targets.

A major drawback of the configuration shown in FIG. 1(b) is that the telescopic sight and the reflector sight require separate eye positions. What is needed is a telescopic sight with tilted viewing axis such that the soldier need not change his eye position when switching his gaze from the reflector sight to the telescoping sight and vice versa.

IV. SUMMARY OF THE INVENTION

The telescopic sight according to this invention features a wedge prism positioned after the eyepiece lens. The wedge prism tilts the eyepiece's viewing axis to allow for a more ergonomic head position on the rifle's stock.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

VI. DETAILED DESCRIPTION OF THE INVENTION

A. Principle of Operation

This invention utilizes wedge prisms. A wedge prism deviates the path of light using the principle of refraction. In contrast to reflective prisms, a wedge prism does not rotate or invert an image. The degree of beam deviation for a wedge prism is calculated as follows:

$$\alpha = \theta - \xi + \sin^{-1}(\sqrt{n^2 - \sin^2\theta} \times \sin\xi - \sin\theta\cos\xi) \quad (1)$$

Figure 2A:
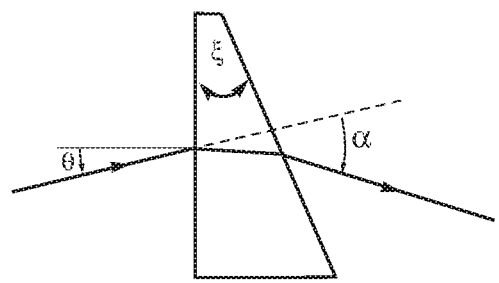
FIG. 2(a) is a schematic showing a wedge prism deviating the direction of a light beam via refraction.

In the above formula a is the beam deviation angle, is the apex angle of the prism, $\theta$ is the incidence angle of the incoming beam and n is the index of refraction of the glass material used for making the prism. This notation is shown in FIG. 2(a). For a wedge prism with small apex angle $\xi$ and when the incidence angle $\theta$ is close to zero, (1) is simplified as $$\alpha \approx (n-1)\xi. \quad (2)$$

Figure 2B:
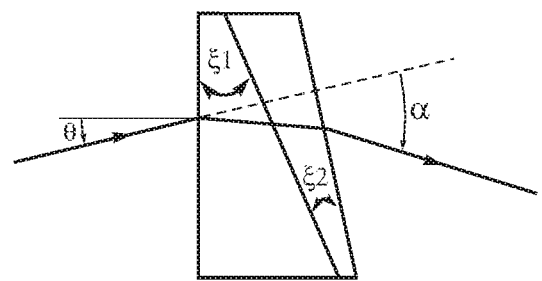
FIG. 2(b) is a schematic showing an achromatic prism.

When a wedge prism is used to bend the path of a collimated (parallel) polychromatic light beam, the only major aberration introduced is chromatic change in the beam deviation angle. This aberration can be corrected by using an achromatic prism. An achromatic prism is made by combining two or more prisms of different refractive index as shown in FIG. 2(b). The component prisms are so designed and placed that a ray of polychromatic light passing through the prism is deviated but not dispersed into a spectrum. Persons skilled in the art of optical engineering are familiar with the design of achromatic prisms so this topic is not discussed further in this section.

B. The Preferred Embodiment of the Invention

Figure 3A:
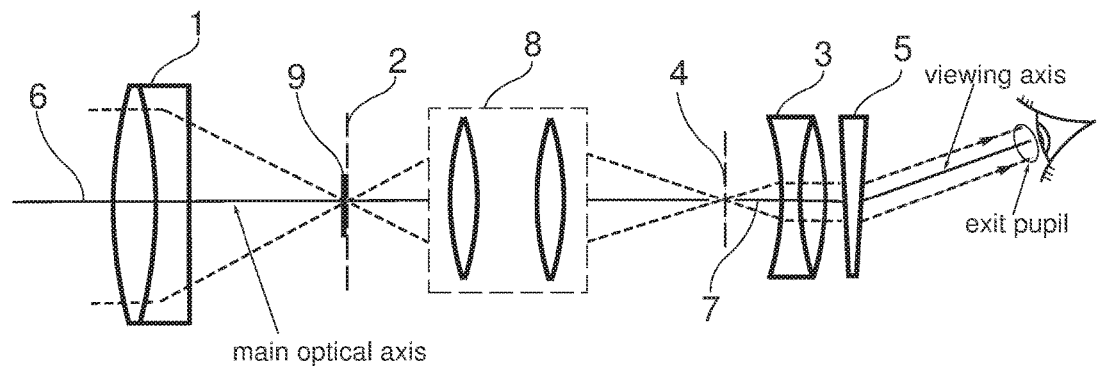
FIG. 3(a) is a schematic depicting a telescopic sight with focal image erector system according to the preferred embodiment of the invention.
Figure 3B:
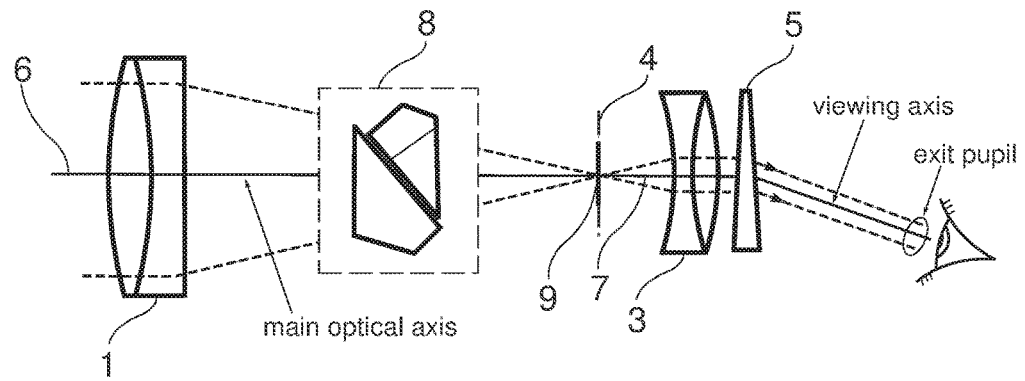
FIG. 3(b) is a schematic depicting a telescopic sight with afocal (prismatic) image erector system according to a preferred embodiment of the invention.

The preferred embodiment of the invention is illustrated in FIGS. 3(a) and 3(b). With reference to FIG. 3(a), the telescopic gun sight with tilted viewing axis has an objective lens 1 which forms a first image of the target at its focal plane 2. The objective focal plane 2 is also called the sight's first focal plane. The objective lens has an optical axis 6 which also defines the sight's main optical axis and the general direction of aim. A reticle or cross hairs 9 is positioned coplanar with the first focal plane 2 to designate the point of aim. The image formed by the objective lens 1 is laterally reversed and upside-down. A focal image-erecting means 8 is positioned after the first focal plane to convert the first image of the target formed by the objective into an upright and laterally-correct second image of the target. An eyepiece lens 3 is positioned after the image-erecting means 8 to convert the second image of the target into a virtual third image for the shooter to see. The eyepiece lens 3 has a focal plane 4 and an optical axis 7. The eyepiece focal plane 4 is also referred to as the sight's second focal plane. The eyepiece focal plane 4 is positioned facing the image erecting means 8 such that the second image of the target formed by the image erecting means 8 is formed at or near the eyepiece focal plane 4. A wedge prism 5 is positioned after the eyepiece lens 3 on the eyepiece optical axis 7 to deviate the viewing axis of the eyepiece lens. The telescopic sight's exit pupil will be offset with respect to the eyepiece optical axis 7.

FIG. 3(*b*) shows how to adapt the telescopic gun sight described in the present embodiment when an afocal (prismatic) image-erecting means is used. With reference to this figure, the afocal image-erecting means 8 is positioned in the converging beam of the objective lens before its focal plane. In this configuration the sight's first focal plane will be coplanar with the second focal plane 4. The reticle 9 is also placed in this same plane.

A key advantage of the present invention is that it requires little change in the optical design of a telescopic gun sight. The wedge prism 5 can be designed separately and added to the optical layout of an existing telescopic gun sight to produce a predetermined amount of lateral offset in the position of its eyepoint.

C. How to Use the Invention

Figure 4A:
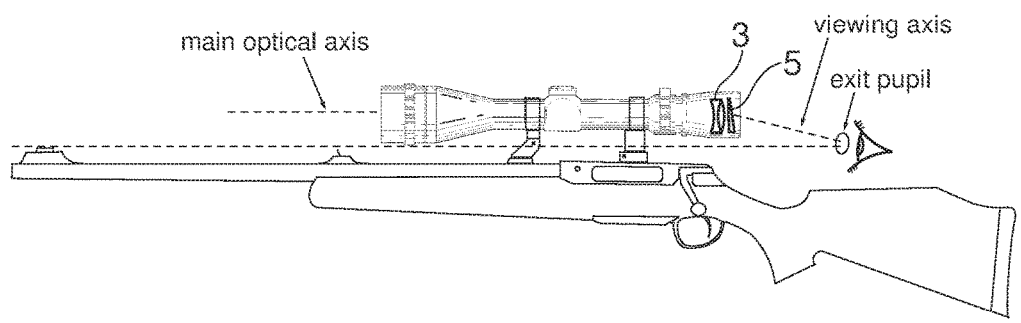
FIG. 4(a) shows how the invention is used to improve eye position ergonomics on a hunting rifle.
Figure 4B:
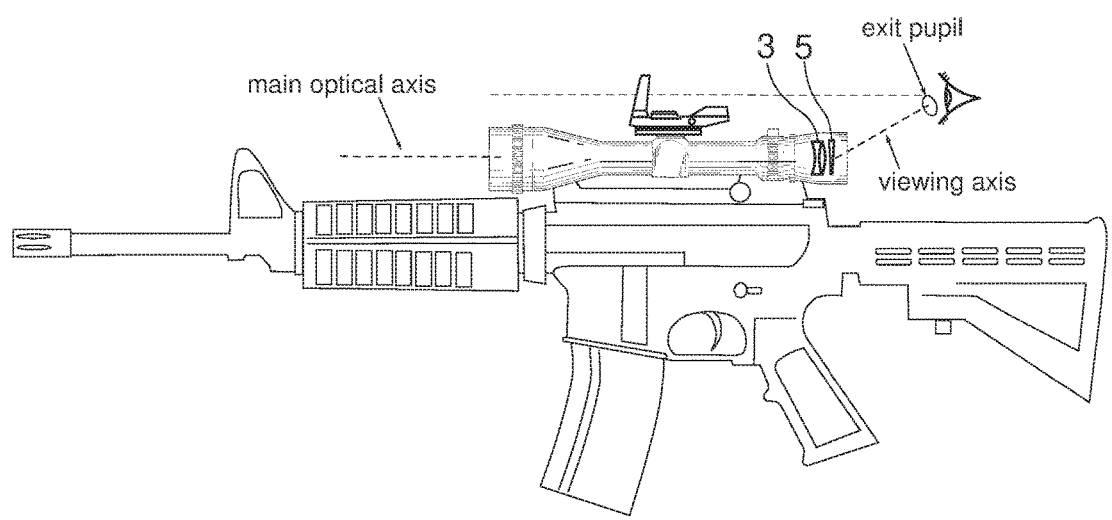
FIG. 4(b) shows how the invention is used to improve eye position ergonomics on a combat rifle which has both telescopic and reflector sights.

Two examples of how to use this invention are illustrated in FIGS. 4(*a*) and 4(*b*).

Figure 1A:
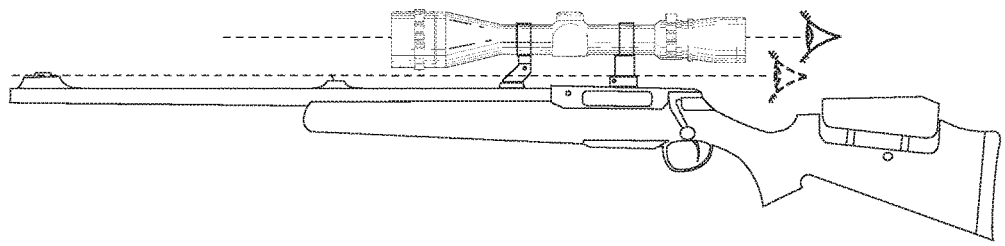
FIG. 1(a) is a schematic showing the change in eye position when aiming through a telescopic sight vs the open sights.
Figure 1B:
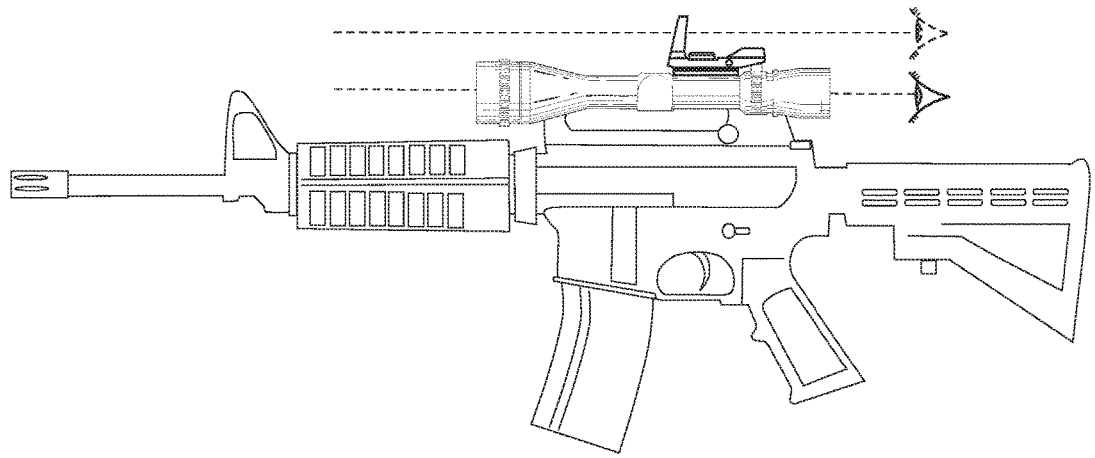
FIG. 1(b) is a schematic showing the separate eye positions needed when using a combination sight formed by mounting a reflector sight on top a telescopic sight.

FIG. 4(*a*) shows a first use case where the telescopic sight with tilted viewing axis is mounted on a hunting rifle which also has open sights. In this figure, the wedge prism 5 is mounted with its base facing downwards. This causes the sight's viewing axis to tilt downwards. The tilted viewing axis allows the shooter to aim at his target from the same head position he would use when aiming with the rifle's open sights. This feature enhances aiming ergonomics and eliminates the need for a raised rifle stock (Compare with FIG. 1(*a*)).

FIG. 4(*b*) shows a second use case where the telescopic sight with tilted viewing axis is mounted on a combat rifle together with a reflex sight. In this figure, the wedge prism 5 is mounted with its base facing upwards. This causes the sight's viewing axis to tilt upwards which, in turn, allows the shooter to aim through his telescopic sight from a higher head position in line with the reflex sight. This feature greatly enhances aiming ergonomics since it eliminates the need for changing head position while using the reflex sight or the telescopic sight (Compare with FIG. 1(*b*)).

D. Advantages

Based on the above descriptions of the invention, a number of advantages over prior art are readily apparent. For example:

1. The invention allows the user to view an image of the target from an eye position which is laterally offset from the sight's main optical axis. Furthermore, no rotation or inversion is applied to the target image so the image viewed by the user remains erect and laterally correct
2. The invention is easy to make and can be retrofitted to existing telescopic sight designs.

VII. Conclusion, Ramifications, and Scope

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:

1. FIGS. 3(*a*) and 3(*b*) show the viewing axis being tilted in the upward or downward directions. This is done for the purpose of illustration. One can readily adapt the methodology described in this invention to shift a telescopic gun sight's viewing axis in any desired direction.
2. In FIG. 3(*a*), the reticle 9 can be placed either at the first focal plane 2 or at the second focal plane 4. In FIG. 3(*b*), the two focal planes coincide and the reticle 9 is placed at the same plane as the two (overlapping) focal planes.
3. For simplicity and brevity, the telescopic sight's housing and the mechanism to adjust the reticle for windage and elevation are not described in the present application. A person of ordinary skill in the art of making telescopic sights would be familiar with adapting a suitable housing and adjustment mechanism from existing art for use with the present invention.

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A telescopic sight for designating a weapon's point of aim when pointed at a target, comprising:
   a. an objective lens for forming a first image of the target, said objective lens having an optical axis which defines the main optical axis of the telescopic sight,
   b. an image-erecting means for converting said first image into an upright and laterally-correct second image, said image erecting means being positioned after said objective lens,
   c. an eyepiece lens for converting said second image into a virtual third image of the target viewable by an operator, said eyepiece lens being positioned after said image erecting means, said eyepiece lens providing a viewing axis and an exit pupil, said exit pupil being positioned at a distance of at least 5 cm behind the eyepiece, d. a reticle for indicating the point of aim, said reticle being positioned coplanar with either said first image of the target or said second image of the target, e. a wedge prism, said wedge prism being positioned after said eyepiece lens and before said exit pupil such that
  i. the eyepiece viewing axis is tilted with respect to the main optical axis,
  ii. the exit pupil is moved to a predetermined location laterally offset from the main optical axis, and
  iii. said third image of the target is viewable by said operator without being reflected, rotated, or inverted when viewed from said predetermined location laterally offset from the main optical axis.

2. The telescopic sight of claim 1 wherein said wedge prism is comprised of an achromatic prism.

* * * * *